United States Patent [19]

Giacomello

[11] Patent Number: 4,759,132
[45] Date of Patent: Jul. 26, 1988

[54] TAPE TRANSDUCER FOR THE INCREMENTAL PRECISION MEASUREMENT OF LINEAR QUANTITIES, WITH PREDETERMINED COEFFICIENT OF THERMAL EXPANSION

[76] Inventor: Giacomo G. Giacomello, Via Domenichino, 50, 20149 Milano, Italy

[21] Appl. No.: 40,156

[22] Filed: Apr. 20, 1987

[30] Foreign Application Priority Data

Apr. 22, 1986 [IT] Italy .................................. 20168 A/86

[51] Int. Cl.$^4$ ............................................. G01B 11/04
[52] U.S. Cl. ................................ 33/125 C; 33/125 T; 33/DIG. 19
[58] Field of Search ............. 33/125 R, 125 A, 125 C, 33/125 T, DIG. 19; 250/237 G; 356/395

[56] References Cited

U.S. PATENT DOCUMENTS

| | | | |
|---|---|---|---|
| 3,816,002 | 6/1974 | Wieg | 33/125 C |
| 4,170,826 | 10/1979 | Holstein | 33/125 T |
| 4,534,113 | 8/1985 | Holstein | 33/125 A |
| 4,541,181 | 9/1985 | Giacomello | 33/125 C |
| 4,559,707 | 12/1985 | Oberhans | 33/125 T |
| 4,584,773 | 4/1986 | Rieder et al. | 33/125 T |

FOREIGN PATENT DOCUMENTS

| | | | |
|---|---|---|---|
| 2631233 | 4/1978 | Fed. Rep. of Germany | 33/125 C |
| 2911047 | 10/1980 | Fed. Rep. of Germany | 33/125 T |
| 1050061 | 12/1966 | United Kingdom | 33/125 T |

Primary Examiner—Richard R. Stearns
Attorney, Agent, or Firm—Young & Thompson

[57] ABSTRACT

The invention concerns a measuring transducer, of the type comprising a rigid support case, a rule in the form of a thin steel tape, pretensioned and suspended at its ends in the support case and having etched thereon the graticule of a measuring scale, as well as a rule reading head mounted in the case slidable along the tape. According to the invention, at least one tensioning bar is fixed to the case at a single point and is freely expansible in respect thereof for the remaining part, through the effect of temperature, the ends of the thin tape of the rule being anchored to the ends of said bar.

5 Claims, 3 Drawing Sheets

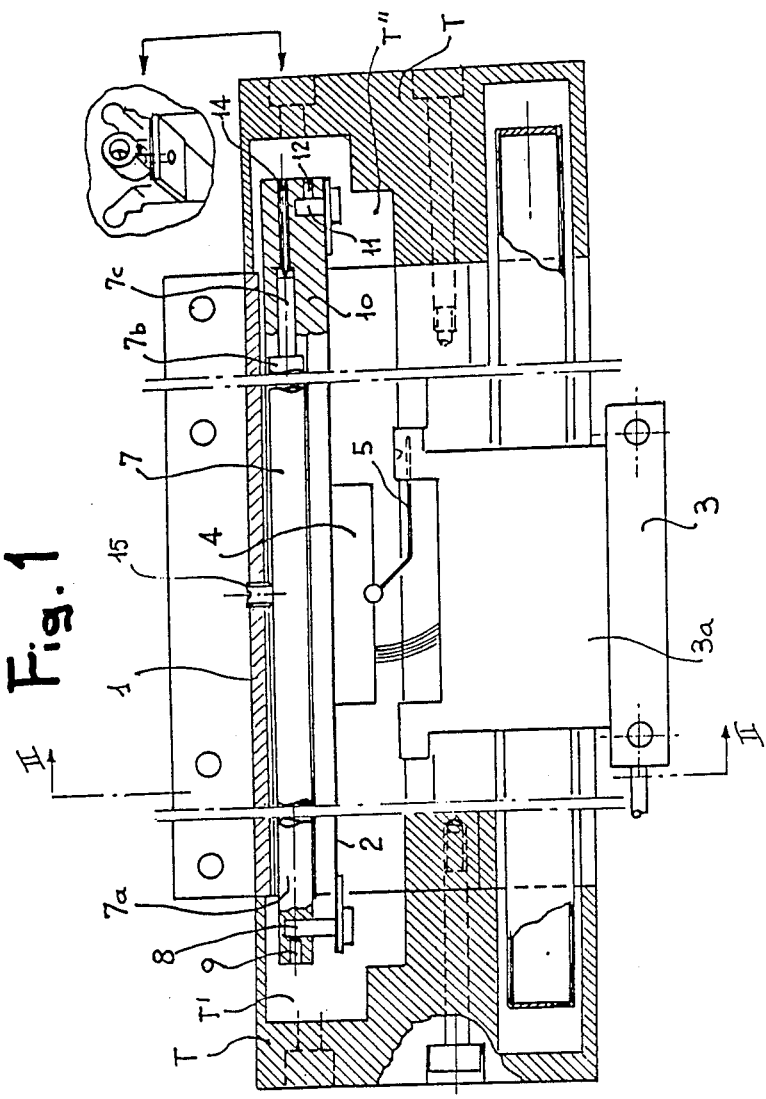

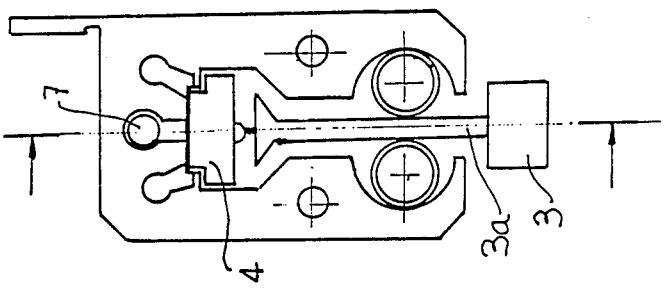
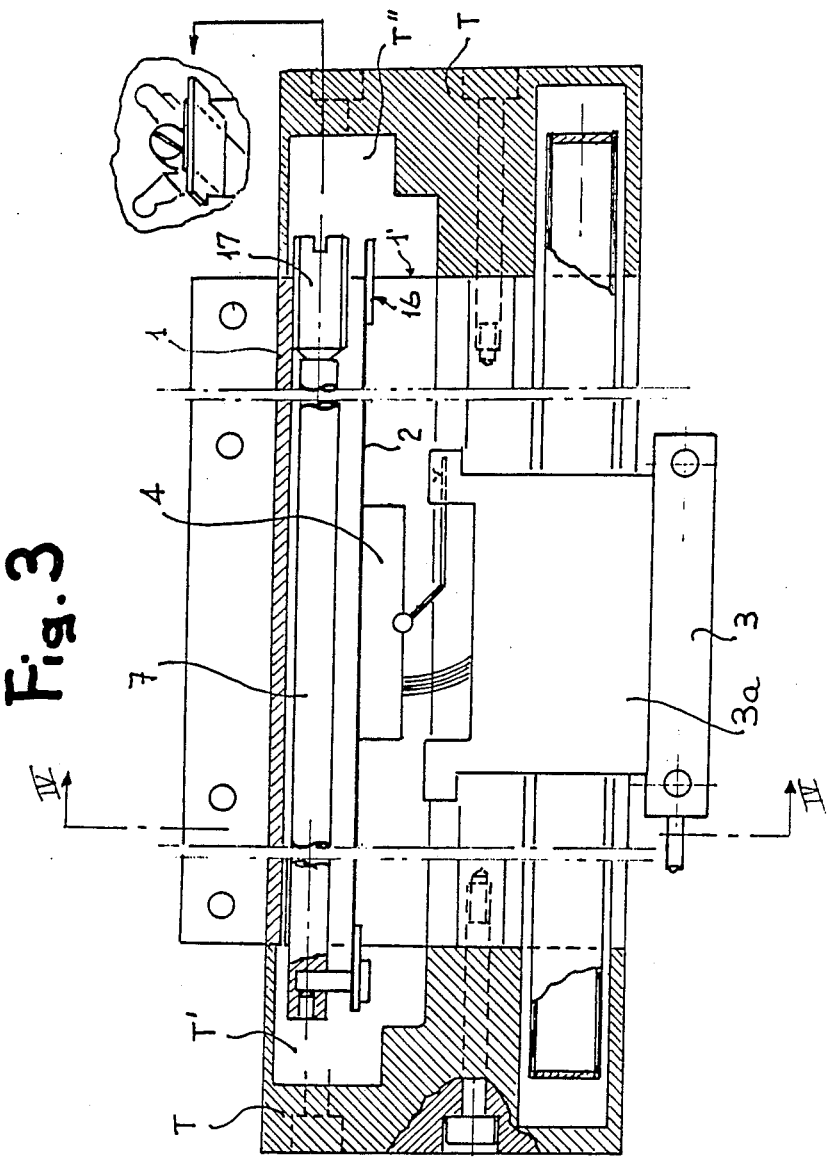

TAPE TRANSDUCER FOR THE INCREMENTAL PRECISION MEASUREMENT OF LINEAR QUANTITIES, WITH PREDETERMINED COEFFICIENT OF THERMAL EXPANSION

BACKGROUND OF THE INVENTION

1. Field of the Invention

The object of the invention is a measurement transducer for the incremental precision measuring of linear quantities, which comprises a measuring rule onto which is reported or etched a measuring scale, and a reading head slidable along said rule. A transducer of this type is generally called an optoelectronic rule or scale.

It is known that in these optoelectronic scales for the incremental measurement of linear quantities, the unitary increments are sensed by reading the moiré fringes produced by optical interference—through transparency or reflection—with two graticules of equal physical quantity, one of which is etched on the measuring rule—generally fixed—and the other is carried by a reading head mounted on a cursor usually slidable along the rule.

It is also known that the graticule etched on the measuring rule expands and shrinks on changing of the temperature, according to the coefficient of expansion of the tape material of the rule. This obviously determines, when not affected by other factors, the coefficient of expansion of the scale, which is generally from $10 \times 10^{-6}$ to $12 \times 10^{-6}$ for steel rules and about $8 \times 10^{-6}$ for glass rules.

2. Description of the Prior Art

The linear measurement transducers using a rule in the form of a thin metal tape comprise a support case, generally consisting of an extruded aluminum section, and the metal tape forming the rule, fixed to the case by means of elastic adhesives, elastomer gaskets and/or other elastic means. The European Patent Application No. 83107557, filed by the same Applicant, describes a structure of this type, wherein the thin tape is suspended at its ends, tensioned, so as to form—together with the support case—an integral whole, the entire length of which can be explored by the reading head associated to the cursor.

All these types of transducers are more or less subject to reading errors, according to the thermal expansions of the rule tape and to the dependance thereof on the expansion of the support case. It is known moreover that any external force added to the thermal expansion force of the rule, if axially applied thereon during the change of temperature, causes an increase or reduction of its natural expansion and consequently determines additional changes in the measuring quantity—in the positive or negative sense—according to the entity and direction of the forces which have caused said changes.

Since, generally, the support case of the rule has a higher coefficient of thermal expansion than that of the metal tape, the result is that, on changing of the temperature, the external force produced by the extruded aluminum support case, acting axially, determines changes in the dilatometric behaviour of the thin tape of the rule, thereby reducing the precision and the linearity of the measuring system.

In other cases, where the tape of the rule has a coefficient of thermal expansion higher than its support (i.e. a machine tool member acting as support), the tape—if not pretensioned—becomes slack or taut, when its temperature is increased or decreased.

To overcome this drawback, for example the Heidenhain European Pat. Nos. 167,857 and 126,888 propose a steel tape rule having impressed on it a graticule of smaller size than the real measure. Thereafter the graticule on the rule is enlarged by tensioning the tape until the real measure is achieved.

Nevertheless, the tensioning of the tape for the purpose of enlarging a graticule of smaller size than the real measure determines a loss of linearity in the measure, due to the fact that the elongation remains constant along the tape length only if the cross section (S) of the tape is constant ($\Delta S = 0$). (As known, laminated steel tape without size tolerances does not exist).

The lack of linearity caused by the inconstancy of the tape cross section ($\Delta S >> 0$) is overcome in the previously cited European Patent application No. 83107557 by impressing the graticule—having the real size of measure—on a pretensioned tape, so as to avoid, when retensioning the tape with the same force, the lack of linearity of the measure. In fact, with this method, the behaviour of the linearity is opposite to that of the previous example, as the loss of linearity is present only in conditions of non-tensioned tape.

So far, attempts have also been made to reduce at least the effects of the thermal expansion of the support case on the thin tape of the rule. For this purpose, corrective systems allowing to partially compensate said effects have been adopted for the transducers with thin etched tape. This has been obtained, for example, by glueing the tape on the support case with highly elastic adhesives and/or by fixing the tape on the support by means of elastomer gaskets, or still better, by fixing the tape to the end of the case by means of springs, after pretensioning the same, as actually described in the aforespecified European Patent Application No. 83107557.

SUMMARY OF THE INVENTION

The object of the present invention is to realize a transducer of the aforementioned type, with the rule in form of a thin tape—with the graticule etched thereon in tensioned tape conditions—mounted suspended and retensioned in a stiff support case, wherein the thermal expansion of the rule is totally independent from that of the support case, that is, allowing to prearrange the thermal expansion of the rule to predetermined known values—higher, equal or lower than the coefficient of expansion of the rule metal tape—or even allowing to obtain a total compensation of the thermal expansion of said rule.

Said object is reached—in a transducer structure comprising a stiff support case, a rule in the form of a thin stainless steel tape, pretensioned and suspended at the ends into the support case, and means to read the rule, mounted in the case and slidable along the tape—essentially due to the fact that, to the support case there is furthermore associated at least one tensioning bar, fixed to the case in a single point and freely expansible in respect thereof for the remaining part, and to the fact that the ends of the thin tape of the rule are simply anchored to the ends of said bar.

The term "steel tape, pretensioned" always refers—hereabove and hereinafter—to a tape being etched under tension, according to the technique described in the aforecited European Patent application No. 83107557, and being then mounted suspended into the support case under a tension equal to that applied during etching.

The cross section of the tensioning bar must be such as to result substantially insensitive to the tensioning force opposed by the tape. Moreover, according to a first fundamental characteristic of the present invention, said bar is formed from a material having a known predetermined coefficient of expansion, which will determine the coefficient of expansion of the rule. Furthermore, according to another fundamental aspect of the invention, the bar can consist of a set of bars of different nature, so as to reach a partial or total compensation of the length variations proper to the bars and to the thin tape.

BRIEF DESCRIPTION OF THE DRAWINGS

Further characteristics and advantages of the transducer according to the present invention will anyhow be more evident from the following detailed description of some preferred embodiments thereof, illustrated by mere way of example on the accompanying drawings, in which:

FIG. 1 is a diagrammatic axial part section view of a first embodiment of the invention, with zero point at the centre of the rule;

FIG. 2 is a cross section view along the line II—II of FIG. 1;

FIG. 3 is a section view, similar to that of FIG. 1, showing another embodiment of the invention, with zero point at one of the ends of the rule;

FIG. 4 is a cross section view along the line IV—IV of FIG. 3;

DESCRIPTION OF THE PREFERRED EMBODIMENTS

Figure 5:
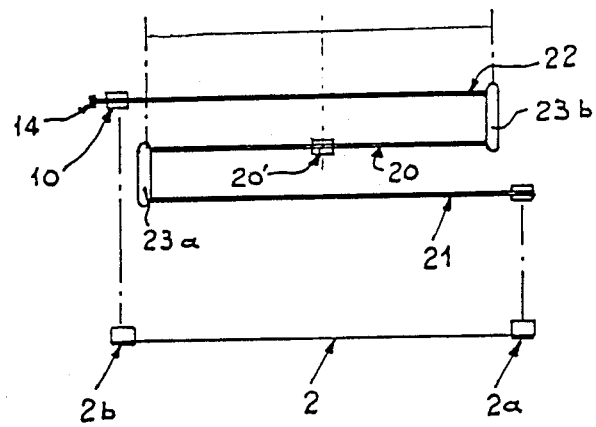
FIG. 5 is a diagram showing a set of three tensioning bars for the total compensation of the thermal expansions.

As shown, the transducer according to the invention comprises a support case 1, into which is housed the rule 2 in the form of a thin stainless steel tape, and along which is slidably mounted a cursor 3, upwardly extending with a lamina 3a supporting a reading head 4. The head 4 is mounted on the lamina 3a of the cursor 3 by means of an arm 5, acting as an elastic suspension member.

The case 1 is obtained from an extruded aluminum section, clearly outlined in FIG. 2. Said section comprises, starting from the bottom, a lower opening 1a through which slides the lamina 3a of the cursor 3; a pair of recesses 1b, each of which houses a lip 6, for example of tubular shape, bearing against the lamina 3a to prevent dust or foreign bodies from penetrating through the opening 1a; a chamber 1c, through which slides the reading head 4 with respective suspension arm 5; a tubular channel 1d, into which is housed the tensioning bar 7, better described hereinafter; and, finally, supplementary channels 1e and 1f which, in the embodiment of FIG. 1, are used for fixing the end sides or closing covers T to the ends of the section 1, by means of screws being screwed directly into the threaded end part of the channels 1e and 1f.

As clearly shown in FIG. 1, and according to a characteristic aspect of the present invention, the tensioning bar 7 supports, anchored to its ends, the thin steel tape 2 forming the rule. At the end 7a, the tape 2 is anchored with a pin 8 which crosses it and which is in turn secured to said end 7a by means of a dowel 9. At the opposite end 7b, the tape 2 is anchored onto a block 10, also by means of a pin 11 secured with a dowel 12; furthermore, the block 10 is slidably mounted on the extension 7c of the bar 7 and bears onto the end of this latter by means of an adjusting screw 14, screwing into a finely threaded hole of said block 10.

By adjusting the position of the screw 14 in respect of the block 10, one regulates its bearing point onto the bar 7, namely the position of the block 10 in respect of the end 7b of the bar 7 and, consequently, also the tensioning of the tape 2.

According to a fundamental characteristic of the present invention, the bar 7 is freely housed into the channel 1d—with sufficient slack to allow said bar to slide or to anyhow expand axially into said channel 1d, though being securely held inside the same in the transversal direction—and it is moreover anchored to the support case 1 only in one point, indicated by 15. In the embodiment of FIG. 1, the point 15 is substantially at the centre of the rule length: it represents the point of no expansion, namely, the so-called zero point.

The end parts of the bar 7, and particularly the parts onto which is anchored the tape 2—by way of the pin 8 on one side, and of the pin 9 and block 10 on the other side—are housed into enlarged recesses T' and T" formed in the end covers T, so as to make it possible to assemble all the parts of the transducer without having to accede to the narrow channels formed in the extruded section 1.

In the embodiment of FIGS. 3 and 4, the structure of the transducer is simplified, in the sense that, while the anchorage of the tape 2 to the end 7a is identical to that shown in FIG. 1, the anchorage of said tape to the end 7b is obtained by welding onto a cross member 16, bearing against the head surface 1' of the section 1. The tensioning of the tape 2 is adjusted by means of the adjusting screw 17, which screws into a fine threading formed directly into the hole of the channel 1d housing the bar 7.

The rest point of the bar 7 against the head of the adjusting screw 17 represents the point of anchorage of said bar 7 to the case 1, namely the zero point (which, in this case, is at one of the ends of the rule, instead of being at the centre as in the previous case).

Figure 7:
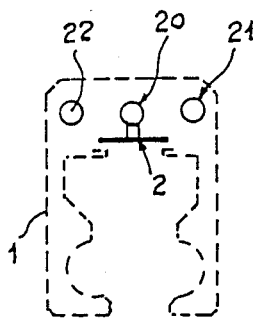
FIG. 7 is a diagrammatic cross section view of a case housing the three-bars system.
Figure 6:
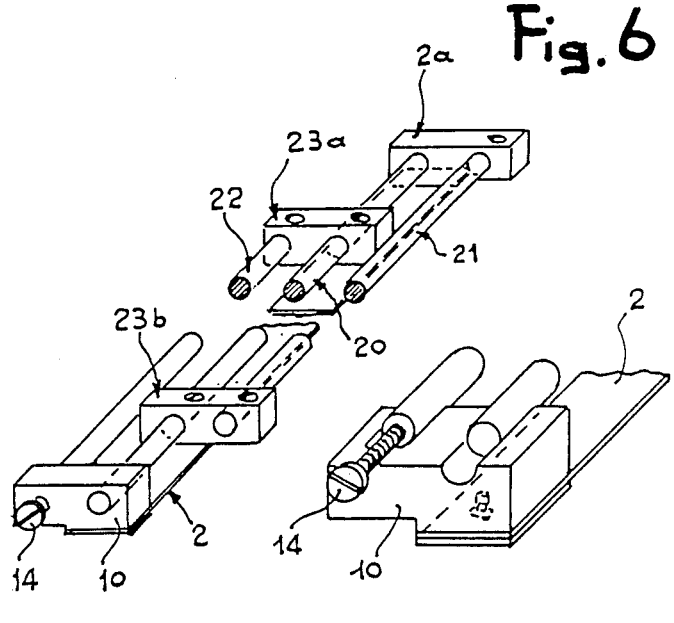
FIG. 6 is a diagrammatic sectional perspective view of the three-bars system shown in FIG. 5.

The tensioning of the thin tape 2 can be obtained—instead of by means of a single tensioning bar 7—through a set of bars, for instance three bars 20, 21, 22, as illustrated in FIGS. 5 to 7. The diagram of FIG. 5 shows a first bar 20, fixed at its centre 20' to the centre of the case 1—as in the case of FIG. 1—and having its two ends fixedly connected to two stiff cross members 23a, 23b; a second bar 21 is fixed by an end to the cross member 23a and carries at the other end one of the ends 2a of the thin tape 2; while a third bar 22 is fixed by an end to the cross member 23b and carries at the opposite end the other end 2b of the thin tape 2, with the interposition of the means 10, 14—already seen in FIG. 1—allowing to adjust the tensioning of the tape 2.

FIG. 6 is a sectional perspective view showing the three-bar structure outlined in FIG. 5. Fig. 7 shows instead how the three bars 20, 21, 22 are housed into the channels 1d, 1e, 1f of the case 1 (see FIG. 2). The function of this set of three bars, like that of a single bar 7, is better described hereinafter.

The bar 7, or the three bars 20, 21, 22, made of metal or other suitable homogeneous material, are housed in the support case on an axis parallel to the axis of the case and are anchored only in one point: this point is preferably at the centre, but the anchorage can also be obtained at one end, or in any other position along the rule length.

Once the tape 2 has been anchored to the ends of the single bar, or of the set of three bars, it undergoes proper tensioning (for example, in the manner described in the previously cited European Patent Application No. 83107557); the pretensioned tape 2 will thus find itself in a suspended position, parallel and almost tangent to the bar, or to the set of bars. Said bars must have a known thermal expansion coefficient, which is chosen—according to an aspect of the present invention—in relation to the type of use foreseen for the measurement transducer. Thanks to the mounting arrangement of the invention, the expansion of the bar, or of the set of bars, is totally independent from the expansion of the support case, since said bar or bars are anchored thereto only in one point.

If the anchorage point of the bar is at the centre, instead of being at one end, the expansions of the tensioning bar, of the tape and of the support case propagate, from the centre of the scale, in two opposite directions, whereby the point of anchorage of the bar to the support case can be defined as "point of equilibrium" or "zero point of expansion of the measuring system".

In practice—in the event of using the measurement transducer thus conceived, for instance in association to the longitudinal axis (X-axis of a machine tool bed—said "zero point of expansion", if at the centre, will coincide with the axle center of the machine bed, inasmuch as being the "zero point" also of the machine bed expansions.

In consideration of the above, according to a first fundamental aspect of the present invention, it becomes possible—by using a tape tensioning bar having a high extension of the tensioning force (Tr) of the measuring tape (as foreseen in the aforecited European Patent Application No. 83107557)—to realize transducers for measuring linear quantities, having a thermal expansion practically comparable to that of the tensioning bar, which is independent from the expansion of the support case.

In the cited conditions, on changing of the temperature of the bar, the measuring graticule etched on the pretensioned tape 2 follows the dilatometric behaviour of the tensioning bar, independently from the coefficient of expansion proper to the tape.

Since the tensioning bar force (Tr) applied to the tape determines an extension of said tape considerably greater than the reciprocal compression of the tensioning bar, it is possible to use bars made of the same material as the tape, or of another homogeneous and isotropous material having a different coefficient of expansion in respect to the tape. This for the purpose of obtaining (for particular applications of the measurement transducer), with the same type of rule tapes, measuring transducers having a thermal expansion equal to the thermal expansion of the materials to be machined. This particularly for machining high thermal expansion materials at any room temperature (as brass, copper, etc.), as well as low thermal expansion materials.

The tensioning force (Tr) applied to the tape at constant temperature ($\Delta t=0$) remains constant, while with $\Delta t \neq 0$ it undergoes slight changes ($\Delta Tr = f\Delta \alpha$), according to the difference of the coefficient of expansion between the bar and the tape.

In practical applications—in view of the performances and of the precision required from such measurement transducers—assuming that with a temperature change $\Delta t = 1°$ C., Tr should apply such a force as to affect the thermal expansion of the bar by $\leq 1 \times 10^{-6}$, the tensioning force (Tr) can be considered practically constant ($\Delta Tr \rightarrow 0$) and thus (to simplify things) be excluded from the calculation required to determine the optimal cross section ($A_2$) of the tensioning bar in relation to the type of tape and of its cross section ($A_1$).

Supposing to tolerate in the measurements of the transducer an error on the thermal expansion of the tape predetermined in $\leq 1 \times 10^{-6}$, in order to calculate the cross section of the tensioning bar it should be assumed, as a condition, that the bar and the tape are always of equal length, having the same temperature and simultaneously undergoing the same temperature changes, and that all the forces involved—tensioning (Tr) force and thermal expansion force—imply stresses largely contained within the area of proportional elasticity of the tape and of the bar.

To calculate the cross section ($A_2$) of the tensioning bar, the following formulas of calculation can be considered—to simplify things—assuming that the coefficient of extension ($\alpha e_2 = 1/E_2$) and ($\neq 0$ $e_1 = 1/E_1$), respectively of the tensioning bar and of the tape, remains unaltered with the temperature existing throughout the interval of use of the measurement transducer (generally from 0° to +50° C.).

Assuming that:

$\lambda_1$ = extension of the tape: $\Delta t = 1°$ C.
$\lambda_2$ = extension of the bar: $\Delta t = 1°$ C.
$\Delta \lambda$ = thermal expansion difference between bar and tape: $\Delta t = 1°$ C.
$\alpha_1$ = coefficient of linear expansion of the tape.
$\alpha$ = coefficient of linear expansion of the bar.
l = length in cm of the bar = tape.
$E_1$ = modulus of elasticity of the tape—kg/cm$^2$
$E_2$ = modulus of elasticity of the bar—kg/cm$^2$
$A_1$ = cross section of the tape—cm$^2$
$A_2$ = cross section of the bar—cm$^2$
$\Delta P$ = Force acting on the bar in function of $\Delta \lambda$
$\Delta \lambda e_1$ = extension or compression of the tape
$\Delta \lambda e_2$ = extension or compression of the bar determined by $\Delta P$ For tensioning bars with linear expansion coefficient ($\alpha_2$ 1) with $\Delta = 1°$ C., the expansion difference between tape and bar is given by:

$$\Delta \lambda = (\lambda_2 - \lambda_1) = (\alpha_2 - \alpha_1)l$$

assuming that:

$$(\alpha_2 - \alpha_1) = \Delta \alpha; \quad \Delta \lambda = \Delta \lambda al \tag{1}$$

Since to such change $\Delta \lambda$ with $\Delta t = 1°$ C., there corresponds a change in the extension of the tape: $\Delta \lambda e_1 = (\Delta pl)/(E_1 A_1)$ assuming that: $(\Delta \lambda e_1)/(\Delta \lambda) = 1$:

$$\Delta P = \Delta \lambda E_1 A_1 \tag{2}$$

Supposing that the tolerable error of the expansions of the measurements in respect of the expansion of the bar with $\Delta t = 1°$ C. and $\leq 1 \cdot 10^{-6}$, one has $\Delta \lambda_2 = (-1 \cdot 10^{-6} l)$, to which there corresponds an extension $\Delta \lambda_2 = \Delta \lambda_2'$ whereby:

$$\Delta \lambda e_2 = (\Delta P_2 l)/(E_2 A_2)$$

and assuming that:
$(\Delta \lambda e_2)/(\Delta \lambda_2) = 1$; $\Delta P_2 = 1 \cdot 10^{-6} \times E_2 A_2$;

premising that $(A_2 > A_1)$ with:

$$\frac{\Delta P}{\Delta P_2} = 1, A_2 = \frac{(\Delta a) E_1 A_1}{1 \times 10^{-6} \times E_2} \quad (3)$$

Since with an equally applied axial force, the extensions are inversely proportional to the section, it ensues that the expansion error by using bars of section $S > A_2$ is reduced to: $S \times \Delta \lambda_2' = A_2 \times \Delta \lambda_2$, whereby:

$$\Delta \lambda_2' = \frac{A_2 \times \Delta \lambda_2}{S} \quad (4)$$

In practical application, in order to obtain in the transducer results comparable to the above calculation—between the bar, the tape and the seats housing the same—the size tolerances must be such as to allow free sliding, with a minimum frictional resistance.

The generally known expedients of fine mechanics can be adopted also in this case (low roughness and high surface hardness of the parts, dry contact, free coupling, and so on).

There follow two Examples of transducers realized according to the present invention:

EXAMPLE 1

Transducer for linear measurements of 1 m, constructed with an INVAR bar having a diameter of 6 mm, and a stainless steel tape having a section of $0.01 \times 1.0$ cm (pretensioned according to the aforecited European Patent Application No. 83107557), for measurements with coefficient of thermal expansion of: $+5 \times 10^{-7} °$ C.

| Characteristics: Material: | Tape St. steel | Bar INVAR |
|---|---|---|
| Cross section (S) = cm$^2$ | 0.01 | 0.283 |
| Modulus of elasticity (E) = kg/cm$^2$ | 2.12 × 10$^6$ | 1.6 × 10$^6$ |
| Tensile strength (KE) = kg/cm$^2$ | 181 × 10$^2$ | 53 × 10$^2$ |
| Coefficient of expansion (a) = 10$^{-6}$/°C. | 10.6 | −1 |
| Specific weight (G) = kg | 7.7 | 8.1 |

From formula (3)

$$A_2 = \frac{11.6 \times 10^{-6} \times 2.12 \times 10^6 \times 1 \times 10^{-2}}{1 \times 10^{-6} \times 1.6 \times 10^6} = 0.154 \text{ cm}^2$$

With the INVAR bar employed, having a diameter of 6 mm, (S=0.283 cm$^2$) the coefficient of expansion error becomes, from (4):

$$\Delta \lambda_2' = -1 \times 10^{-6} \times 0.154/0.283 = -5.44 \times 10^{-7}$$

And the coefficient of expansion of the transducer becomes: $-1.544 \times 10^{-6}$

EXAMPLE 2

Transducer as in Example 1, constructed with a brass bar having a diameter of 6 mm, and a stainless steel tape, like the previous one:

| Characteristics: Material: | TAPE Stainless steel | BAR BRASS |
|---|---|---|
| Cross section (S) = cm$^2$ | 0.01 | 0.283 |
| Modulus of elasticity (E) = kg/cm$^2$ | 2.12 × 10$^6$ | 8 × 10$^5$ |
| Tensile strength (KE) = kg/cm$^2$ | 181 × 10$^2$ | 15 × 10$^2$ |
| Coefficient of expansion (a) = 10$^{-6}$/°C. | 10.6 | 19.2 |
| Specific weight (G) = kg | 7.7 | 8.5 | one has:

$$A_2 = \frac{11.5 \times 10^{-6} \times 2.12 \times 10^6 \times 1 \times 10^{-2}}{1 \times 10^{-6} \times 8 \times 10^5} = 0.305 \text{ cm}^2$$

With the brass bar employed, having a diameter of 6 mm (S=0.283) the coefficient of expansion error becomes, from (4):

$$\Delta \lambda_2 = -1 \times 10^{-6} \times 0.305/0.283 = -1.07 \times 10^{-6}$$

And the coefficient of expansion of the transducer becomes: $18.13 \times 10^{-6}$ As an alternative to the above transducer, with single INVAR tensioning bar, the example is provided of a transducer, having the same characteristics, formed with a tape—pretensioned according to the cited European Patent Application No. 83107557—stretched at the ends on a set of three bars, of which two steel bars fixed in contraposition to the ends of a brass bar, in order to obtain the tensioning of the tape, with overall expansion coefficient tending to zero and without using INVAR metal. (The COLBY system to compensate expansions through contraposition of bars of different expansions, is known per se, in that it has been largely used also in the past).

The cited transducer has been constructed in a length of 1 m, using the stainless steel tape rule mentioned in Example 1 and with the same type of steel bar.

For the brass bar, the same type of bar as in Example 2 has been used.

The set of three bars (of which the two steel ones must be of equal length) has been—in known manner—suitably sized as far as length ratios, so as to nullify the temperature coefficient ($\Delta t/\Delta a = 0$) over the length of 1 m, established for the anchorage of the tape ends.

To calculate both the optimal section ($A_2$) of the three bars connected in contraposed series, and the expansion error resulting from the use of bars of section $S = A_2$, the cited formulas have been modified in relation to the resulting coefficient of elasticity ($E_x$), with the due considerations.

With such a three-bar system, the nullification of the expansion can be obtained by modifying the length ratio of the central brass bar in respect of the lateral bars.

The tape tensioning bar for linear measurement transducers having different thermal expansion coefficients, using always the same tape, can be formed of a single element or of two or more elements connected in series, from the following materials, anyhow combined: INVAR, Steel, Brass, Zinc, molten Silica, Glass, Ceramic.

It is evident that by using a single type of tape for the measuring rule (pretensioned according to the cited European Patent Application No. 83107557), one can obtain at low cost and in a very simple manner, by replacing the tensioning bar, transducers which are particularly suited for specific purposes of use requiring special coefficients of thermal expansion of the measuring system.

This does not exclude the use for current requirements of measurement transducers having an expancoefficient from $8\times10^{-6}$ to $12\times10^{-6}/°C$. which, at the present state of art, are generally produced with measuring rule made of glass or stainless steel.

I claim:

1. In a measuring transducer, of the type comprising a rigid support case, a rule in the form of a thin steel tape, pretensioned and suspended at its ends in the support case and having etched thereon the graticule of a measuring scale, as well as a rule reading head mounted in the case and slidable along the tape; the improvement comprising at least one tensioning bar fixed to the case at a single point and freely expansible in respect thereof for the remaining part, the ends of the thin tape of the rule being anchored to the ends of said bar.

2. Transducer as in claim 1, wherein the tensioning bar has a cross section considerably larger than that of the thin tape anchored thereto, thereby to be substantially insensitive to the tensioning force of the tape.

3. Transducer as in claim 1, wherein the tensioning bar is formed from a material having a predetermined coefficient of thermal expansion.

4. Transducer as in claim 1, wherein said tensioning bar consists of a set of bar lengths, positioned in series, having different expansion coefficients, so as to provide a predetermined coefficient of linear expansion of the bar system.

5. Transducer as in claim 4, wherein the tensioning bar consists of three bar lengths, of which two are of steel and one of brass, connected in contraposition, so as to obtain a total compensation of the thermal expansion.

* * * * *